(12) United States Patent
Huang

(10) Patent No.: US 9,850,644 B1
(45) Date of Patent: Dec. 26, 2017

(54) PLUNGER-TYPE DIAPHRAGM VALVE

(71) Applicant: HYDROTEK CORPORATION, Nantou Hsien (TW)

(72) Inventor: Su Huang, Nantou Hsien (TW)

(73) Assignee: HYDROTEK CORPORATION, Nantou Hsien (TW)

( * ) Notice: Subject to any disclaimer, the term of this patent is extended or adjusted under 35 U.S.C. 154(b) by 0 days.

(21) Appl. No.: 15/236,118

(22) Filed: Aug. 12, 2016

(51) Int. Cl.
*E03D 3/06* (2006.01)
*E03D 5/10* (2006.01)
*F16K 31/12* (2006.01)
*F16K 31/128* (2006.01)

(52) U.S. Cl.
CPC .............. *E03D 3/06* (2013.01); *E03D 5/10* (2013.01); *F16K 31/128* (2013.01)

(58) Field of Classification Search
CPC ............ F16K 31/128; E03D 3/06; E03D 5/10
USPC .......................................... 251/30.02, 30.05
See application file for complete search history.

(56) References Cited

U.S. PATENT DOCUMENTS

| | | | | |
|---|---|---|---|---|
| 3,011,751 A | * | 12/1961 | Delany | E03D 3/04 |
| | | | | 137/599.16 |
| 3,049,231 A | * | 8/1962 | Crandall | B65H 67/062 |
| | | | | 209/559 |
| 4,717,116 A | * | 1/1988 | Ishigaki | F16K 31/402 |
| | | | | 251/30.02 |
| 5,244,179 A | | 9/1993 | Wilson | |
| 5,979,863 A | * | 11/1999 | Lousberg | F16K 31/402 |
| | | | | 137/549 |
| 6,000,674 A | * | 12/1999 | Cheng | E03D 3/06 |
| | | | | 137/545 |
| 6,457,697 B1 | * | 10/2002 | Kolze | F16K 31/404 |
| | | | | 251/30.02 |
| 7,437,778 B2 | * | 10/2008 | Parsons | E03C 1/05 |
| | | | | 137/554 |
| 9,033,305 B2 | * | 5/2015 | Schreier | F16K 31/408 |
| | | | | 251/30.01 |
| 2004/0061083 A1 | * | 4/2004 | Cheng | F16K 7/14 |
| | | | | 251/30.01 |

* cited by examiner

Primary Examiner — Michael R Reid
Assistant Examiner — Jonathan Waddy
(74) Attorney, Agent, or Firm — Ming Chow; Sinorica, LLC

(57) ABSTRACT

A plunger-type diaphragm valve is disposed in an accommodation trough of a flush device. The accommodation trough communicates with an inlet passage and an outlet passage. The valve includes a control unit. One end of the control unit is provided with a diaphragm member and an engaging member, and another end leans against the outlet passage to block the inlet passage and the outlet passage. An outer wall of the diaphragm member is fixed to the accommodation trough. The diaphragm member has a curved portion. When the valve is actuated, the curved portion is deformed by water pressure to bring the control unit to move away from the inlet passage for the inlet passage to communicate with the outlet passage. The stressed area of the diaphragm member is small and the deformation is less, so the diaphragm member won't wear. The valve is durable and has a long life.

6 Claims, 11 Drawing Sheets

PLUNGER-TYPE DIAPHRAGM VALVE

BACKGROUND OF THE INVENTION

1. Field of the Invention

The present invention relates to a water valve, and more particularly to a plunger-type diaphragm valve.

2. Description of the Prior Art

Conventional water valves are classified to a plunger valve and a diaphragm valve. As shown in FIG. 1, a plunger valve 200 is disposed in an accommodation trough 301 of a flush device 300. The accommodation trough 301 is in communication with an inlet passage 302 and an outlet passage 303 of the flush device 300. The plunger valve 200 is located between the inlet passage 302 and the outlet passage 303. The top of the plunger valve 200 is connected with a controller (not shown in the drawing). The top of the plunger valve 200 is provided with a slide rubber member 201 for blocking the inlet passage 302 and the controller. The bottom of the plunger valve 200 is provided with a swash rubber member 202 for blocking the inlet passage 302 and the outlet passage 303. The plunger valve 200 is controlled by the controller to move up and down in the accommodation trough 301, such that the inlet passage 302 can be in communication with the outlet passage 303.

Referring to FIG. 2, U.S. Pat. No. 5,244,179 discloses a diaphragm valve 400. The diaphragm valve 400 has an accommodation trough 401. The accommodation trough 401 is in communication with an inlet passage 402 and an outlet passage 403. The accommodation trough 401 is provided with a flexible diaphragm member 500. The diaphragm member 500 has a pressure relief passage 501 and a pressure guide passage 502. The pressure relief passage 501 is for communication of the outlet passage 403 and the accommodation trough 401. The pressure guide passage 502 is for communication of the inlet passage 402 and the accommodation trough 401. The diaphragm member 500 is used for blocking the inlet passage 402 and the outlet passage 403. Another side of the diaphragm member 500 is provided with a controller (not shown in the drawing). The controller is to hold against the pressure relief hole 501. Through the actuation of the controller, the diaphragm member 500 is displaced toward the controller for the inlet passage 402 to be in communication with the outlet passage 403.

However, after a period of time, because the plunger valve 200 is moved up and down in the accommodation trough 301, the slide rubber member 201 suffers a lot of wear and tear due to slide and friction. As a result, the slide rubber member 201 is unable to block the inlet passage 302 and the controller. The plunger valve 200 may have a leakage and be damaged easily, and its service life is short. The stressed area of the diaphragm member 500 of the diaphragm valve 400 is large, and the deformation is large. After a period of time, the diaphragm valve 400 may be deformed and damaged. The diaphragm valve 400 is damaged easily, and its service life is short. Accordingly, the inventor of the present invention has devoted himself based on his many years of practical experiences to solve these problems.

SUMMARY OF THE INVENTION

The primary object of the present invention is to provide a plunger-type diaphragm valve which is durable and has a long service life In order to achieve the aforesaid object, the plunger-type diaphragm valve of the present invention is disposed in an accommodation trough of a flush device. The flush device has an inlet opening in a radial direction thereof. The inlet opening is in communication with the accommodation trough. The flush device has an outlet opening underneath the accommodation trough. The flush device further has an inlet passage and an outlet passage corresponding to the inlet opening and the outlet opening respectively. The plunger-type diaphragm valve may include a control unit, a diaphragm member, an engaging member, and a drain member. The control unit has a first end and a second end. The control unit is formed with a first guide hole in a radial direction thereof. The first end of the control unit is formed with at least one second guide hole. The second guide hole is in communication with the first guide hole. The second end of the control unit is able to lean against the bottom of the accommodation trough to block the inlet passage and the outlet passage. The diaphragm member is disposed at the first end of the control unit. An outer wall of the diaphragm member is fixed to the wall of the accommodation trough, enabling the accommodation trough to form a first accommodation room and a second accommodation room. The diaphragm member has at least one curved portion. The diaphragm member is formed with a third guide hole corresponding to the second guide hole. The diaphragm member is flexible. The engaging member is disposed on top of the diaphragm member to secure the diaphragm member. The drain member is coupled to a top end of the first accommodation room to form a chamber among the drain member, the diaphragm member and the engaging member. The chamber is in communication with the second guide hole.

Thereby, through the engaging member to secure the diaphragm member and the outer wall of the diaphragm member to be fixed to the wall of the accommodation trough, when the plunger-type diaphragm valve is actuated, the curved portion of the diaphragm member is deformed by water pressure to bring the control unit to move toward the chamber for the inlet passage to communicate with the outlet passage. Because the outer wall of the diaphragm member is fixed to the wall of the accommodation trough, the diaphragm member won't wear subject to slide. The stressed area of the diaphragm member is small and the deformation is less. As a result, the diaphragm member won't be deformed and damaged easily after a period of time. The plunger-type diaphragm valve is durable and has a long service life.

DETAILED DESCRIPTION OF THE PREFERRED EMBODIMENTS

Figure 1:
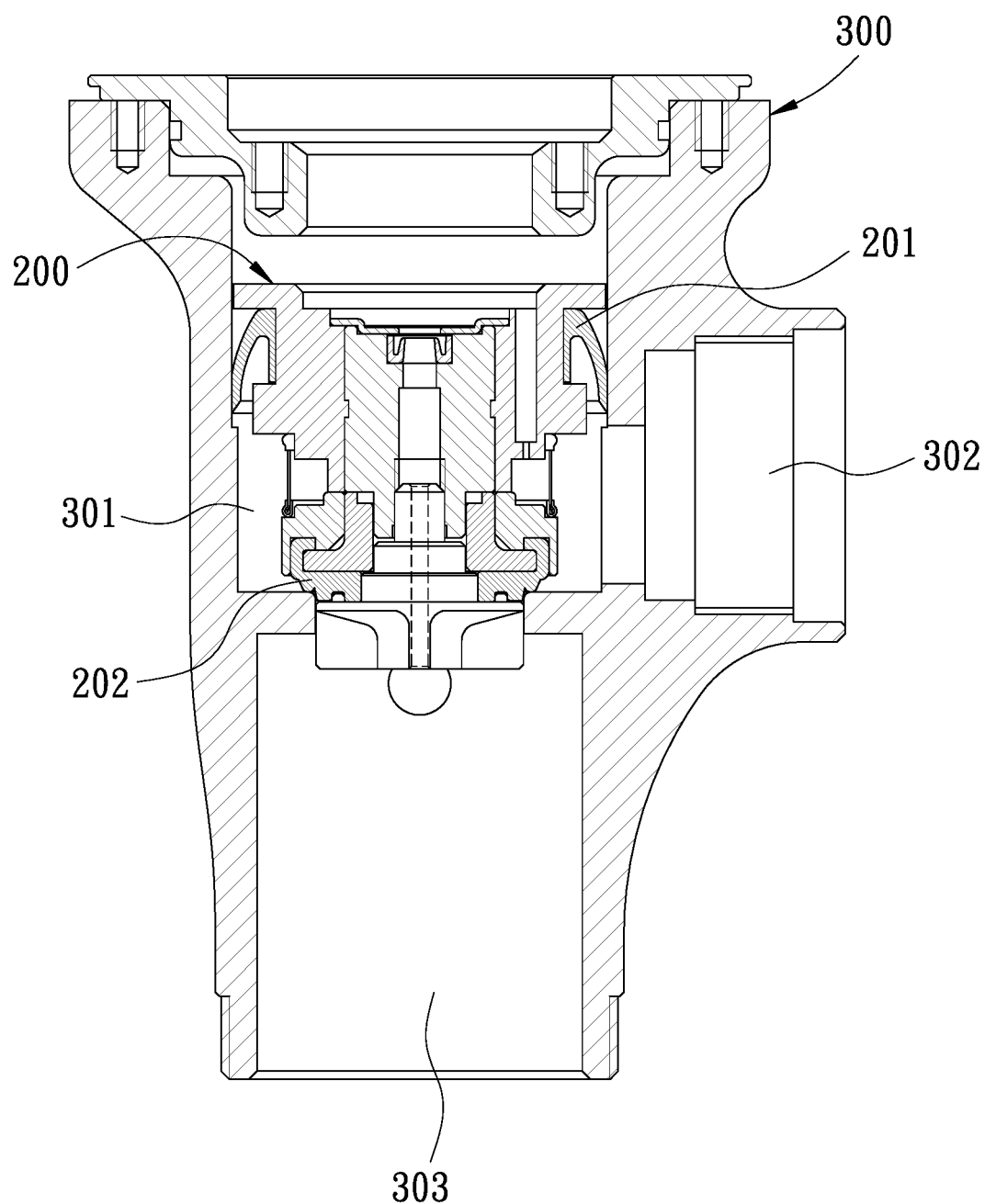
FIG. 1 is a sectional view of a conventional plunger valve mounted in a flush device.
Figure 2:
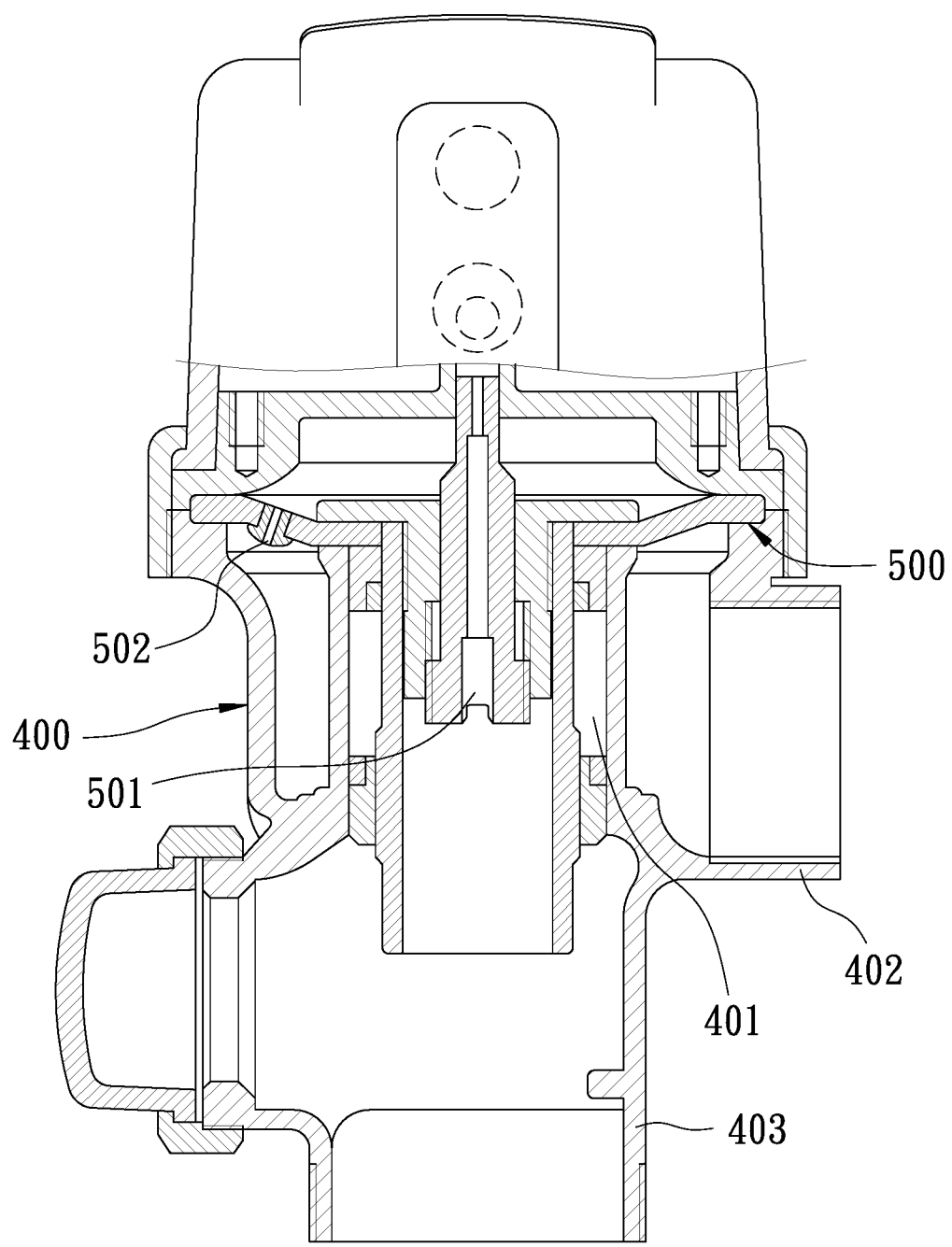
FIG. 2 is a sectional view of a conventional diaphragm valve.
Figure 3:
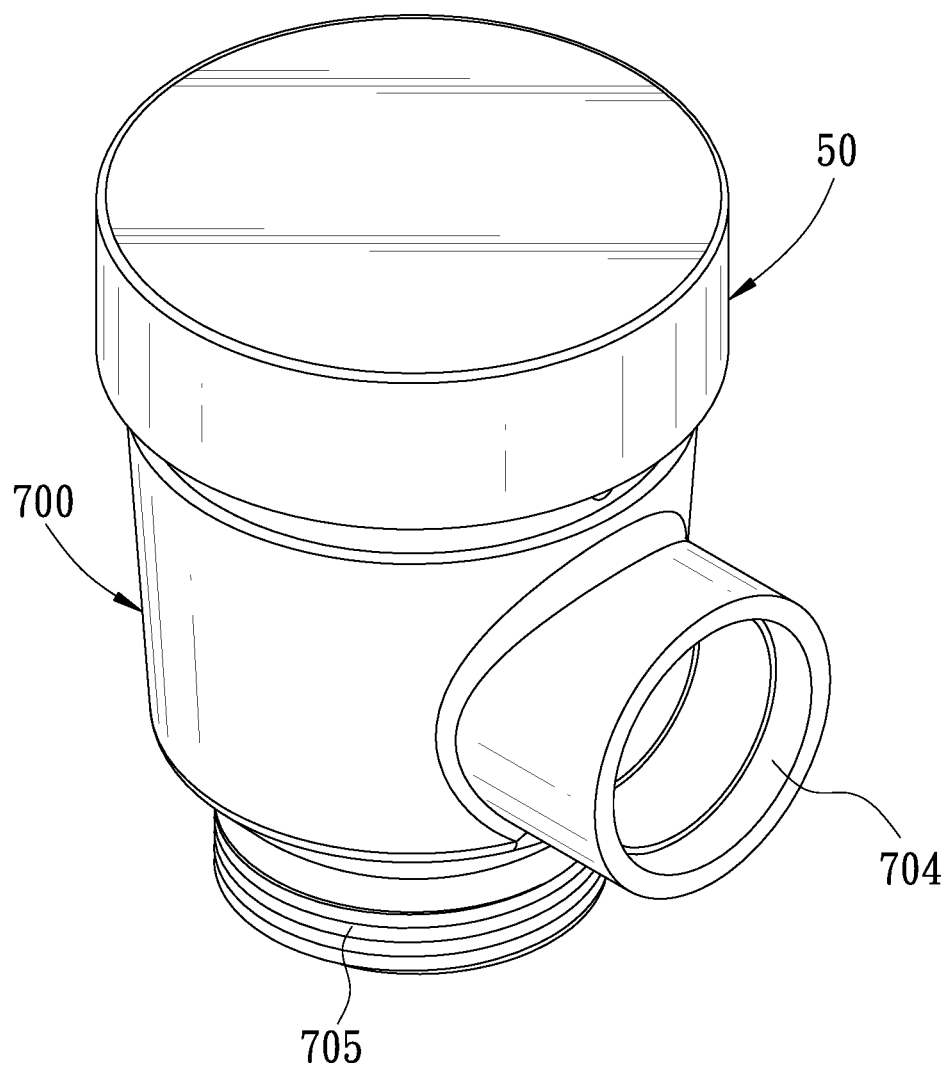
FIG. 3 is a perspective view in accordance with a preferred embodiment of the present invention.
Figure 4:
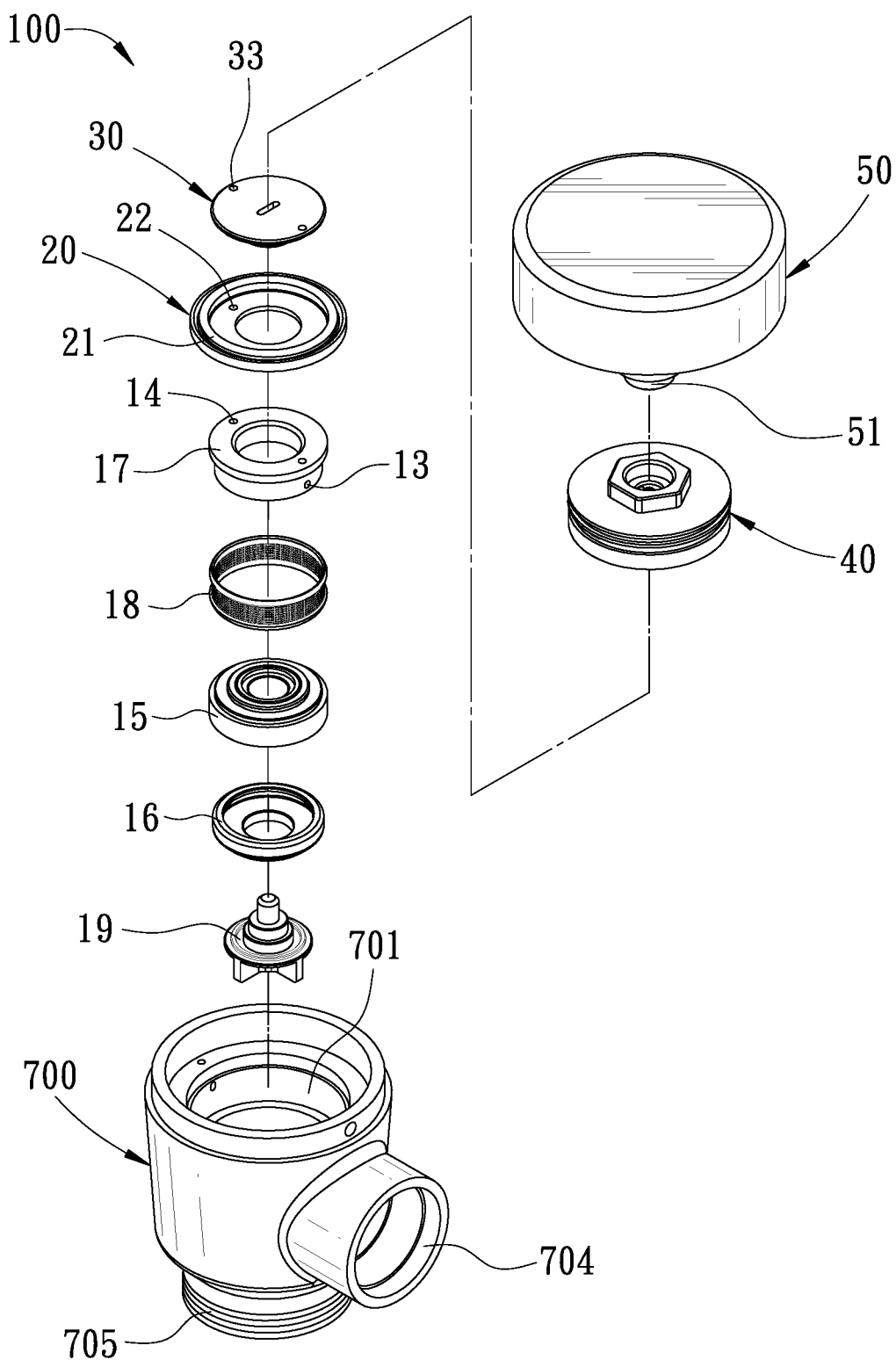
FIG. 4 is an exploded view in accordance with the preferred embodiment of the present invention.
Figure 5:
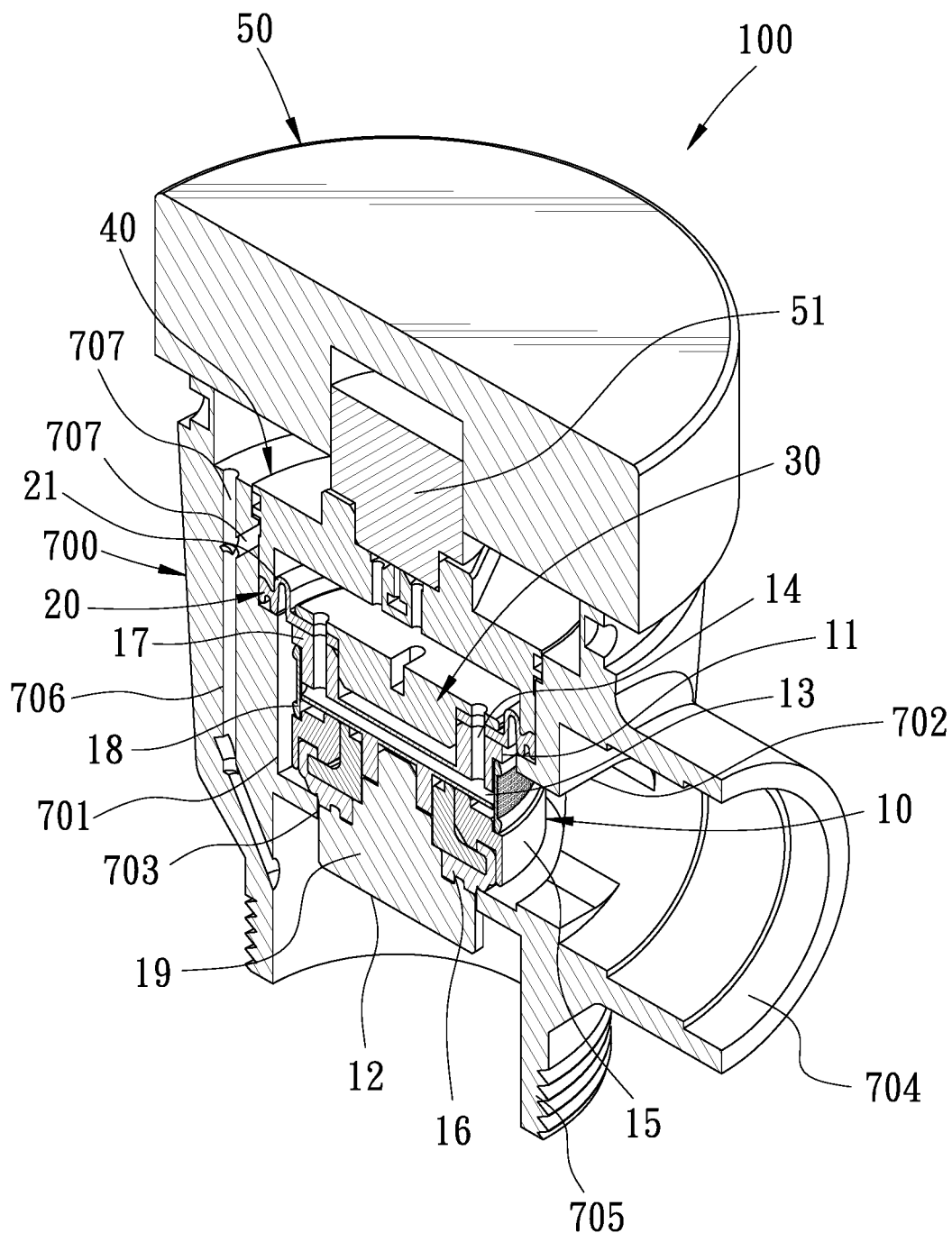
FIG. 5 is a sectional view in accordance with the preferred embodiment of the present invention.
Figure 6:
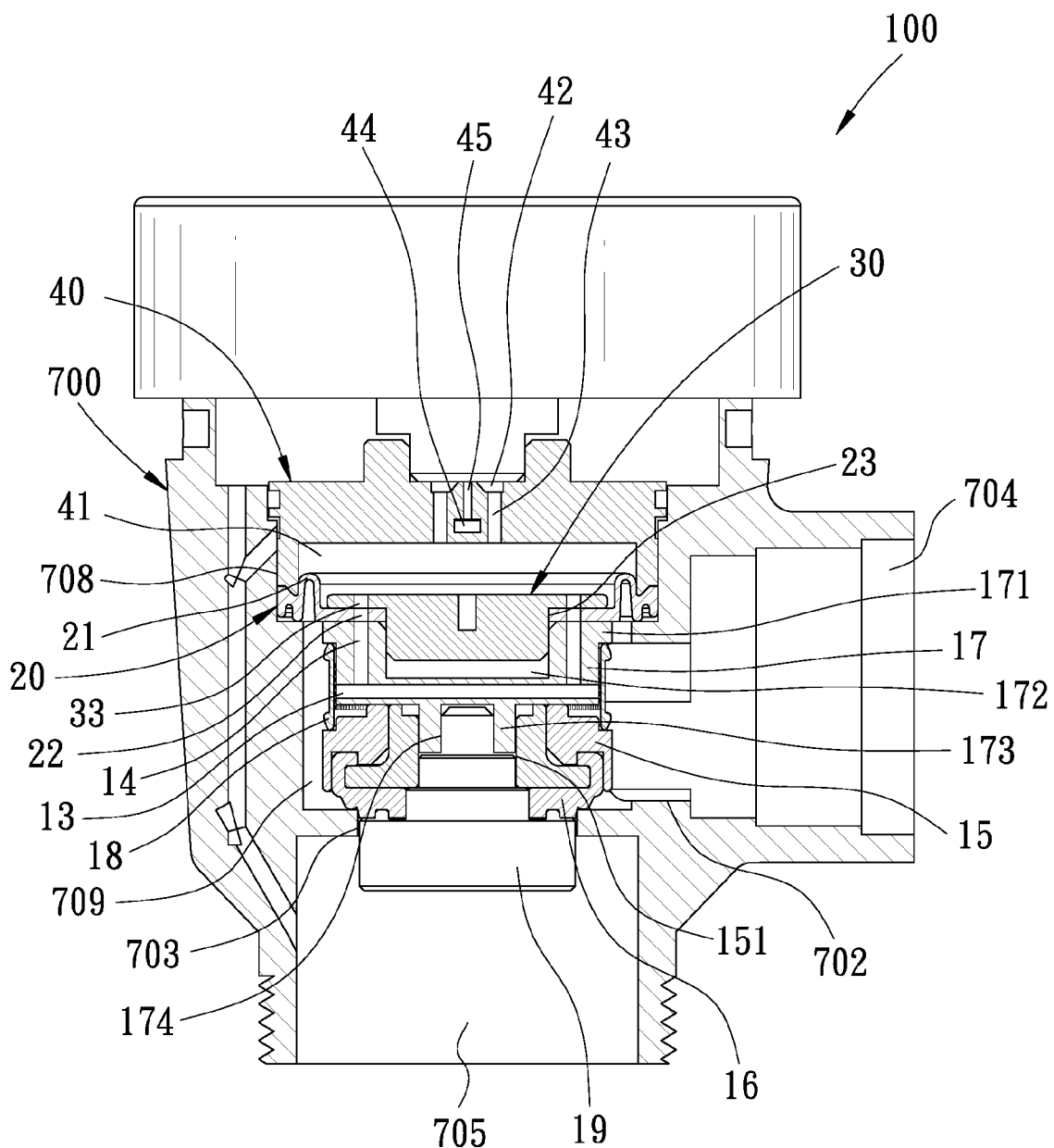
FIG. 6 is a first side sectional view in accordance with the preferred embodiment of the present invention.

Embodiments of the present invention will now be described, by way of example only, with reference to the accompanying drawings.

Referring to FIG. 3 through FIG. 6, the present invention discloses a plunger-type diaphragm valve 100. The plunger-type diaphragm valve 100 is disposed in an accommodation trough 701 of a flush device 700. The flush device 700 has an inlet opening 702 in a radial direction thereof. The inlet opening 702 is in communication with the accommodation trough 701. The flush device 700 has an outlet opening 703 underneath the accommodation trough 701. The flush device 700 further has an inlet passage 704 and an outlet passage 705 corresponding to the inlet opening 702 and the outlet opening 703 respectively. In addition, the flush device 700 has a drain passage 706. One end of the drain passage 706 diverges to form two bifurcated passages 707. The two bifurcated passages 707 extend to the top of the flush device 700 and the wall of the accommodation trough 701. Another end of the drain passage 706 is in communication with the outlet passage 705. The plunger-type diaphragm valve 100 may include a control unit 10, a diaphragm member 20, an engaging member 30, a drain member 40, and a solenoid valve 50.

The control unit 10 has a first end 11 and a second end 12. The control unit 10 is formed with a first guide hole 13 in a radial direction thereof. The first end 11 of the control unit 10 is formed with at least one second guide hole 14. The second guide hole 14 is in communication with the first guide hole 13. Furthermore, the second end 12 of the control unit 10 is able to lean against the bottom of the accommodation trough 701 and extends out of the outlet opening 703 for blocking the inlet passage 704 and the outlet passage 705. In the preferred embodiment of the present invention, the control unit 10 includes a seat 15. The seat 15 has a through hole 151 corresponding to the outlet opening 703. The seat 15 is provided with a swash rubber member 16 to surround the seat 15. The swash rubber member 16 is able to lean against the bottom of the accommodation trough 701 for blocking the inlet passage 704 and the outlet passage 705. The control unit 10 further includes a control disk 17. The control disk 17 has a flange 171 at a top rim thereof. The top of the control disk 17 is formed with an engaging trough 172. The bottom of the control disk 17 is provided with a connecting block 173 corresponding to the through hole 151. The connecting block 173 is formed with a locking hole 174. The control disk 17 is formed with the first guide hole 13 and two second guide holes 14. An outer wall of the control disk 17 is provided with a filter screen 18. The filter screen 18 is located between the flange 171 and the seat 15. Besides, the control unit 10 further includes a plug 19. One end of the plug 19 is inserted through the swash rubber member 16 and the through hole 151 and then locked to the locking hole 174. Another end of the plug 19 extends out of the outlet opening 703.

The diaphragm member 20 is disposed at the first end 11 of the control unit 10. An outer wall of the diaphragm member 20 is fixed to the wall of the accommodation trough 701, enabling the accommodation trough 701 to form a first accommodation room 708 and a second accommodation room 709. The diaphragm member 20 has at least one curved portion 21. The diaphragm member 20 is formed with a third guide hole 22 corresponding to the second guide hole 14. Additionally, the diaphragm member 20 is flexible. In the preferred embodiment of the present invention, the diaphragm member 20 is disposed on top of the control disk 17 and has an engaging hole 23 corresponding to the engaging trough 172.

The engaging member 30 is disposed on top of the diaphragm member 20 to secure the diaphragm member 20. In the preferred embodiment of the present invention, the engaging member 30 includes an engaging block 31. The engaging block 31 is inserted through the engaging hole 23 and engaged in the engaging trough 172. The engaging block 31 is provided with a stop piece 32 at a top edge thereof to secure the diaphragm member 20. The stop piece 32 is formed with a fourth guide hole 33 corresponding to the third guide hole 22.

Figure 7:
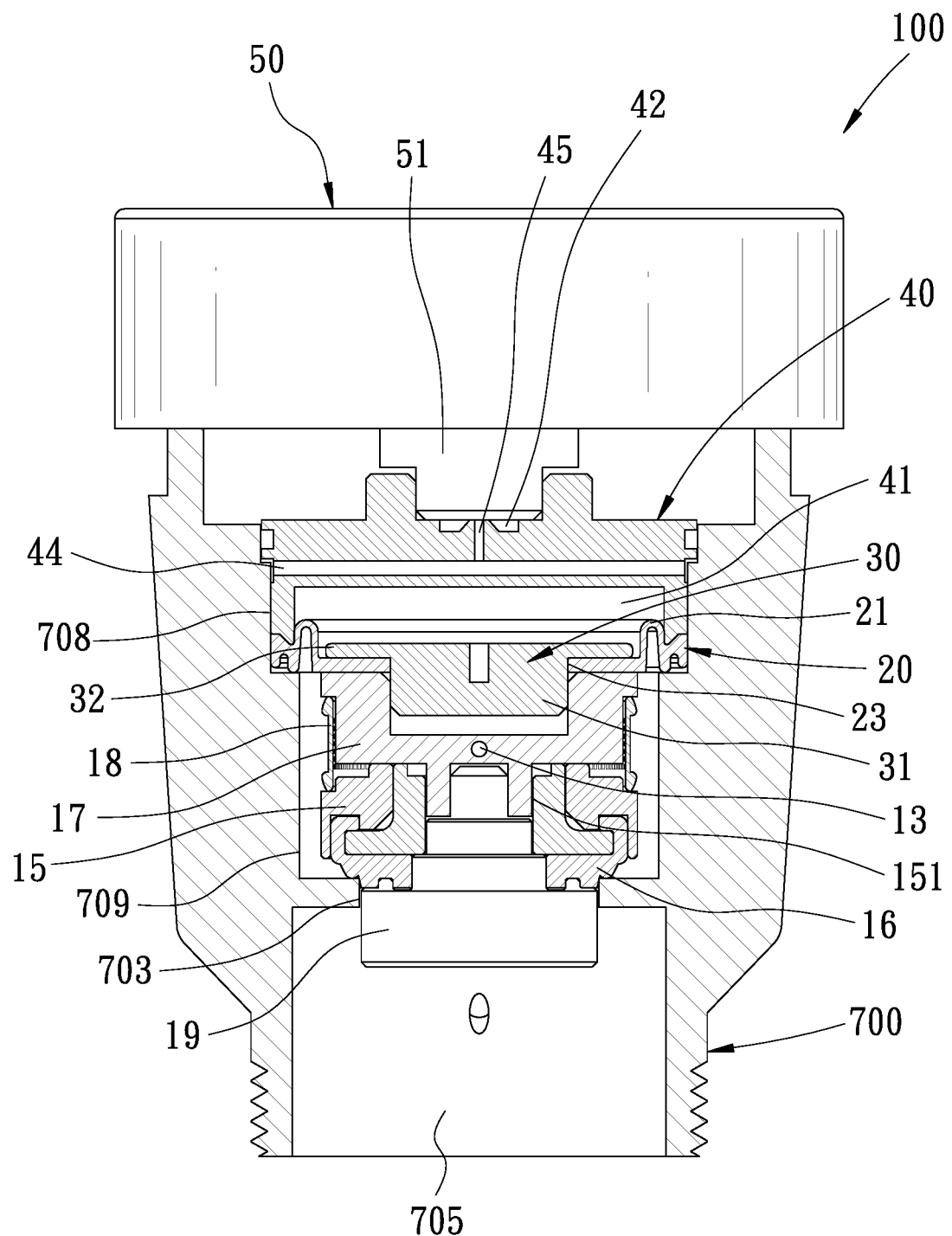
FIG. 7 is a second side sectional view in accordance with the preferred embodiment of the present invention.

The drain member 40 is coupled to a top end of the first accommodation room 708 to form a chamber 41 between the drain member 40 and the diaphragm member 20. Referring to FIG. 7, in the preferred embodiment of the present invention, a top surface of the drain member 40 is formed with an annular groove 42. The bottom of the annular groove 42 is formed with two symmetrical first drain holes 43. The first drain holes 43 are in communication with the chamber 41. The drain member 40 is formed with a second drain hole 44 in a radial direction thereof. The second drain hole 44 is located between the first drain holes 43. The second drain hole 44 is in communication with the first accommodation room 708. The drain member 40 is further formed with a third drain hole 45 between the first drain holes 43. The third drain hole 45 is in communication with the second drain hole 44.

The solenoid valve 50 is disposed on top of the drain member 40. The solenoid valve 50 includes a control block 51 therein. The solenoid valve 50 controls the control block 51 to move up and down so as to open or close the third drain hole 45.

Figure 8:
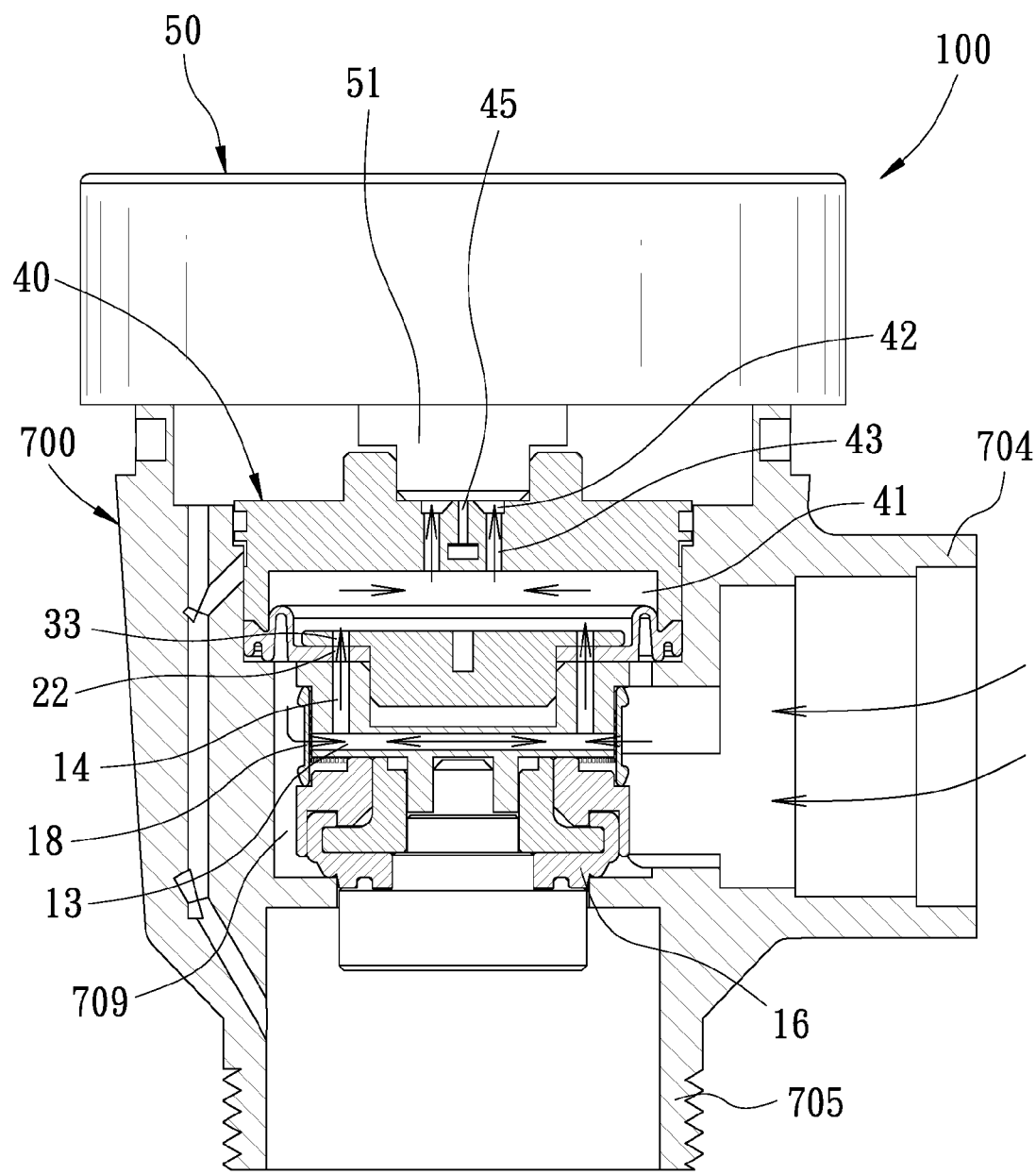
FIG. 8 is a first schematic view in accordance with the preferred embodiment of the present invention when in use, showing that the plunger-type diaphragm valve is not actuated.

Referring to FIG. 8, when the plunger-type diaphragm valve 100 is not actuated, the solenoid valve 50 is in a closed state. The water flows from the inlet passage 704 to enter the second accommodation room 709 and pass through the filter screen 18, and then flows through the first guide hole 13, the second guide holes 14, the third guide holes 22, the fourth guide holes 33, the chamber 41, the first drain holes 43, and the annular groove 42 in sequence. Because the control member 51 blocks the third drain hole 45, the third drain hole 45 is not in communication with the annular groove 42. The swash rubber member 16 leans against the bottom of the second accommodation room 709 to block the inlet passage 704 and the outlet passage 705, such that the water flowing from the inlet passage 704 is stored in the second accommodation room 703, the first guide hole 13, the second guide holes 14, the third guide holes 22, the fourth guide holes 33, the chamber 41, the first drain holes 43, and the annular groove 42.

Figure 9:
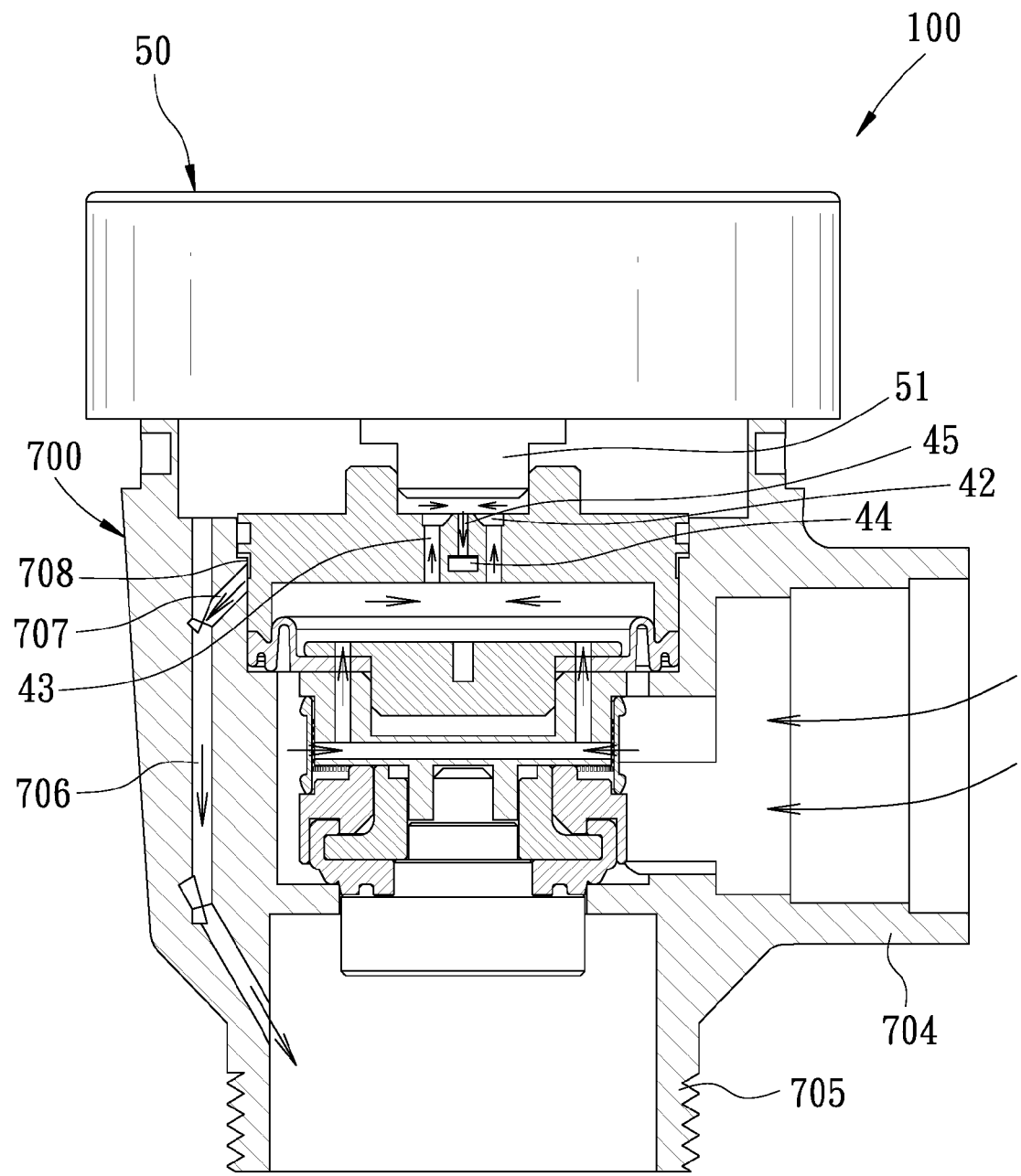
FIG. 9 is a second schematic view in accordance with the preferred embodiment of the present invention when in use, showing that the solenoid valve is actuated.
Figure 10:
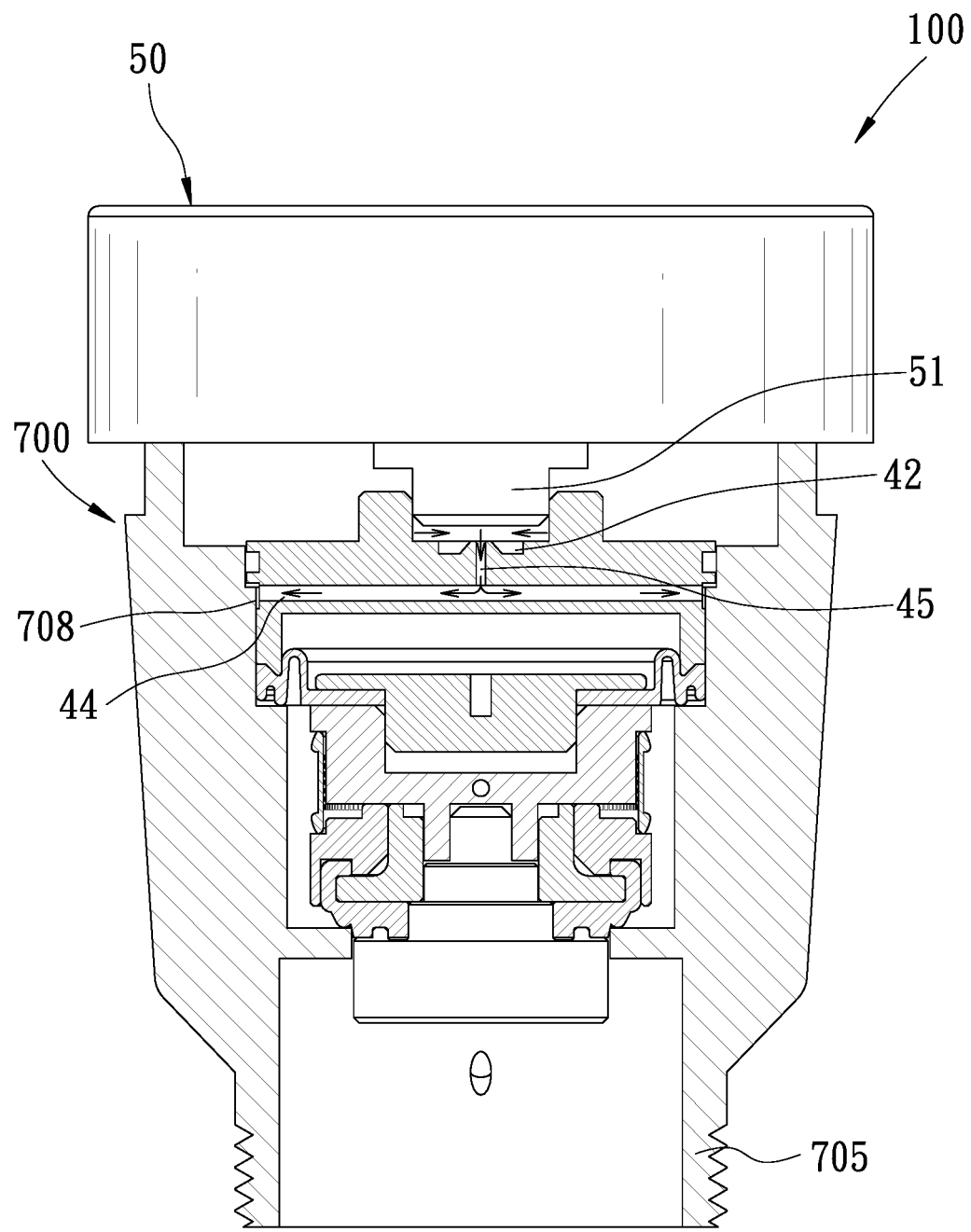
FIG. 10 is a third schematic view in accordance with the preferred embodiment of the present invention when in use, showing that the solenoid valve is actuated.

Referring to FIG. 9 and FIG. 10, when the plunger-type diaphragm valve 100 is actuated, the solenoid valve 50 is in an open state. The control block 51 is moved upward for the annular groove 42 to communicate with the third drain hole 45. At this time, the water is delivered to the third drain hole 45 and flows through the second drain hole 44, the first accommodation room 708, the bifurcated passage 707, and the drain passage 706, and finally flows out from the outlet passage 705.

Figure 11:
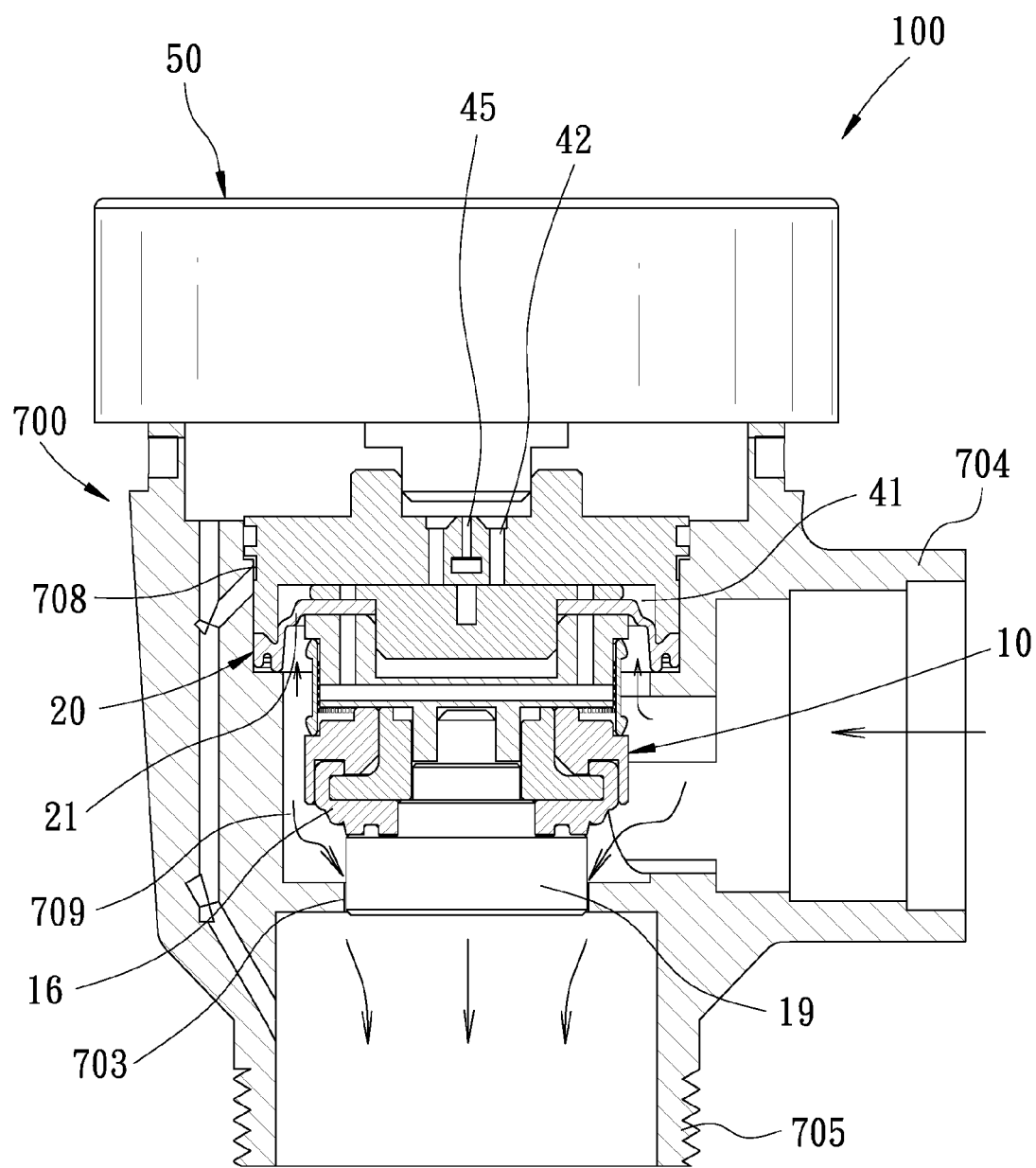
FIG. 11 is a fourth schematic view in accordance with the preferred embodiment of the present invention when in use, showing that the plunger-type diaphragm valve is actuated.

As shown in FIG. 11 as well as FIG. 9 and FIG. 10, when the annular groove 42 is in communication with the third drain hole 45, the water pressure of the second accommodation room 709 is greater than that of the first accommodation room 708. The diaphragm member 20 is pushed by the water pressure of the inlet passage 704 and deformed at the curved portion 21 to bring the control unit 10 to move toward the chamber 41, such that the swash rubber member 16 and the plug 19 are moved away from the outlet opening 703 for the inlet passage 704 to communicate with the outlet passage 705. The water from the inlet passage 704 flows to the outlet passage 705. When the solenoid valve 50 is closed, the annular groove 42 is not in communication with the third drain hole 45. The control unit 10 is moved toward the outlet opening 703, so that the inlet passage 704 is not in communication with the outlet passage 705, as shown in FIG. 8.

Thereby, when the plunger-type diaphragm valve 100 is actuated, because the engaging member 30 is to secure the diaphragm member 20 and the outer wall of the diaphragm member 20 is fixed to the wall of the accommodation trough 701, the curved portion 21 of the diaphragm member 20 is deformed by the water pressure to bring the control unit 10 to move toward the chamber 41 for the inlet passage 704 to communicate with the outlet passage 705. Because the outer wall of the diaphragm member 20 is fixed to the wall of the accommodation trough 701, the diaphragm member 20 won't wear due to slide. The stressed area of the diaphragm member 20 is small and the deformation is less. As a result, the diaphragm member 20 won't be deformed and damaged easily after a period of time. The plunger-type diaphragm valve 100 is durable and has a long service life.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A plunger-type diaphragm valve, disposed in an accommodation trough of a flush device, the flush device having an inlet opening in a radial direction thereof, the inlet opening being in communication with the accommodation trough, the flush device having an outlet opening underneath the accommodation trough, the flush device further having an inlet passage and an outlet passage corresponding to the inlet opening and the outlet opening respectively, the plunger-type diaphragm valve comprising:

a control unit, having a first end and a second end, the control unit being formed with a first guide hole in a radial direction thereof, the first end of the control unit being formed with at least one second guide hole, the second guide hole being in communication with the first guide hole, the second end of the control unit being able to lean against a bottom of the accommodation trough for blocking the inlet passage and the outlet passage;

a diaphragm member, disposed at the first end of the control unit, an outer wall of the diaphragm member being fixed to a wall of the accommodation trough, enabling the accommodation trough to form a first accommodation room and a second accommodation room, the diaphragm member having at least one curved portion, the diaphragm member being formed with a third guide hole corresponding to the second guide hole, the diaphragm member being flexible;

an engaging member, disposed on top of the diaphragm member to secure the diaphragm member;

a drain member, coupled to a top end of the first accommodation room to form a chamber among the drain member, the diaphragm member and the engaging member, the chamber being in communication with the second guide hole;

in response to the plunger-type diaphragm valve being actuated, the curved portion of the diaphragm member being deformed by water pressure to bring the control unit to move toward the chamber for the inlet passage to communicate with the outlet passage, by the engaging member securing the diaphragm member so as to render the outer wall of the diaphragm member fixed to the wall of the accommodation trough;

the control unit comprising a seat;

the seat having a through hole corresponding to the outlet opening;

the seat being provided with a swash rubber member to surround the seat;

the swash rubber member being able to lean against the bottom of the accommodation trough;

the control unit further comprising a control disk;

the control disk having a flange at a top rim thereof;

a bottom of the control disk being provided with a connecting block corresponding to the through hole;

the connecting block being formed with a locking hole;

the control disk being formed with the first guide hole and the second guide hole;

an outer wall of the control disk being provided with a filter screen;

the filter screen being located between the flange and the seat;

the control unit further comprising a plug;

one end of the plug being inserted through the swash rubber member and the through hole and locked to the locking hole; and another end of the plug extending out of the outlet opening.

2. The plunger-type diaphragm valve as claimed in claim 1, wherein a top of the control disk is formed with an engaging trough, and the diaphragm member is disposed on top of the control disk and has an engaging hole corresponding to the engaging trough.

3. The plunger-type diaphragm valve as claimed in claim 2, wherein the engaging member comprises an engaging block, the engaging block is inserted through the engaging hole and engaged in the engaging trough, the engaging block is provided with a stop piece at a top edge thereof to secure the diaphragm member, and the stop piece is formed with a fourth guide hole corresponding to the third guide hole.

4. The plunger-type diaphragm valve as claimed in claim 1, wherein the flush device has a drain passage, one end of the drain passage diverges to form two bifurcated passages, the two bifurcated passages extend to a top of the flush device and a side wall of the first accommodation room, and another end of the drain passage is in communication with the outlet passage.

5. The plunger-type diaphragm valve as claimed in claim 1, wherein a top surface of the drain member is formed with an annular groove, a bottom of the annular groove is formed with two symmetrical first drain holes, the first drain holes are in communication with the chamber, the drain member is formed with a second drain hole in a radial direction thereof, the second drain hole is located between the first drain holes, the second drain hole is in communication with the first accommodation room, the drain member is further formed with a third drain hole between the first drain holes, and the third drain hole is in communication with the second drain hole.

6. The plunger-type diaphragm valve as claimed in claim 5, further comprising a solenoid valve disposed on top of the drain member, the solenoid valve comprising a control block therein, the solenoid valve controlling the control block to move up and down so as to open or close the third drain hole.

* * * * *